United States Patent [19]

Soga et al.

[11] 4,074,034
[45] Feb. 14, 1978

[54] HARDENABLE COMPOSITION

[75] Inventors: Mitsuo Soga; Yuuzo Takase; Manabu Ishikawa; Masahiko Nakazawa; Mutumi Nakayama, all of Tokyo, Japan

[73] Assignee: Asahi Denka Kogyo K.K., Tokyo, Japan

[21] Appl. No.: 612,860

[22] Filed: Sept. 12, 1975

[51] Int. Cl.$^2$ ............................................. C08F 8/08
[52] U.S. Cl. ...................................... 526/56; 526/20; 526/21; 526/57
[58] Field of Search .................... 526/56, 57, 20, 21

[56] References Cited

U.S. PATENT DOCUMENTS

| 2,838,478 | 6/1958 | Hillyer et al. | 526/56 |
| 3,210,328 | 12/1965 | Kiefer | 526/56 |

Primary Examiner—William F. Hamrock
Attorney, Agent, or Firm—Blanchard, Flynn, Thiel, Boutell & Tanis

[57] ABSTRACT

A hardenable composition, useful as a heat-curable coating composition and as a printing ink, comprising as an essential film-forming component a polymer of 60 to 100 mole % of 1,3-pentadiene and 0 to 40 mole % of 1,3-butadiene, said polymer containing epoxy groups, hydroxy groups and acyloxy groups and having a molecular weight of 320 to 15,000.

4 Claims, No Drawings

HARDENABLE COMPOSITION

BACKGROUND OF THE INVENTION

1. Field of the Invention

This invention relates to a hardenable composition. Further, this invention relates to a polymer having good film-forming properties. More particularly, this invention relates to heat-curable compositions suitable for paints and printing inks, and comprising a polypentadiene or a pentadienebutadiene copolymer which is modified with epoxy groups and hydroxy groups, of which a part can be esterified to acyloxy groups in some cases.

2. Description of the Prior Art

Previously, chlorinated resins, cellulose nitrate, xylenic resins, polyamide resins, toluenic resins or phenolic resins have been used as film-forming ingredients of thermosetting paints and printing inks.

Although, for example, chlorinated resins have good flame retardancy, chemical resistance and adhesiveness, they have poor weatherability and poor light stability. More particularly, if they are weathered for a long time, they readily change in color or are degraded, and furthermore if they are heated at a high temperature, they begin to decompose into HCl gas and other decomposition substances.

Also, cellulose nitrate has poor weatherability, poor light stability and other poor properties. Worse yet, if it is heated, shocked or exposed to sunshine, it begins to ignite and burn.

Aromatic resins, such as xylenic, toluenic, and phenolic resins, have poor weatherability because of their phenyl moieties.

As another example, a modified polybutadiene containing epoxy groups is described in U.S. Pat. No. 3,253,000. It is an improved film-forming coating resin having good flexibility in comparison with the previously described resins such as aromatic resins, but it has poor weatherability, poor light stability and poor bondability (adhesion), in industrial use.

SUMMARY OF THE INVENTION

It is an object of this invention to provide a hardenable composition, useful as a film-forming ingredient of printing inks and heat-curable paints.

Further, it is an object of this invention to provide a hardenable composition comprising a modified polypentadiene or a pentadiene-butadiene copolymer containing epoxy groups and hydroxy groups, a part of which may be esterified to acyloxy groups.

It is an object of this invention to provide a heat-curable composition having improved weatherability and light stability in comparison with the above-described resins.

More particularly it is an object of this invention to provide a heat-curable composition suitable for use as a film-forming ingredient and which has improved properties, such as weatherability, light stablity, heat resistance, water proofness, chemical resistance, flexibility, hardness, freedom from objectionable odor and toxic effects, bondability (adhesion), abrasion resistance, dryness, working properties, specular gloss and so on.

A further object of this invention is to provide a printing ink, and a heat-curable composition used as a vehicle for paints and as a binder for decorative laminated paper, containing the modified polypentadiene or pentadiene-butadiene copolymer and other components, such as other resins, fillers, pigments, solvents, etc.

According to the present invention, there is provided a hardenable composition containing, as a critical component, a modified polymer consisting essentially of 60 to 100 mole % of 1,3-pentadiene and 0 to 40 mole % of 1,3-butadiene, said polymer also containing epoxy groups and hydroxy groups, a part of which may be esterified to acyloxy groups, and said polymer having a molecular weight of 320 to 15,000, preferably 550 to 7,500.

A preferred process of preparing the modified polymer used in the present invention, comprises reacting polypentadiene or a pentadiene-butadiene copolymer, aqueous hydrogen peroxide and a lower aliphatic carboxylic acid.

The polypentadiene or pentadiene-butadiene copolymer used as the starting material in the reaction, preferably, has an average molecular weight of about 300 to 10,000, more preferably about 500 to 5,000, and it consists essentially of 50 to 90 molar % of cis-1,2 and trans-1,2 bonded monomer units and the balance, i.e., 10 to 50 molar % of 3,4, cis-1,4 or trans-1,4 bonded monomer units.

The structural formulas of the cis-1,2 etc. bonds are as follows (for the 1,3-pentadiene unit):

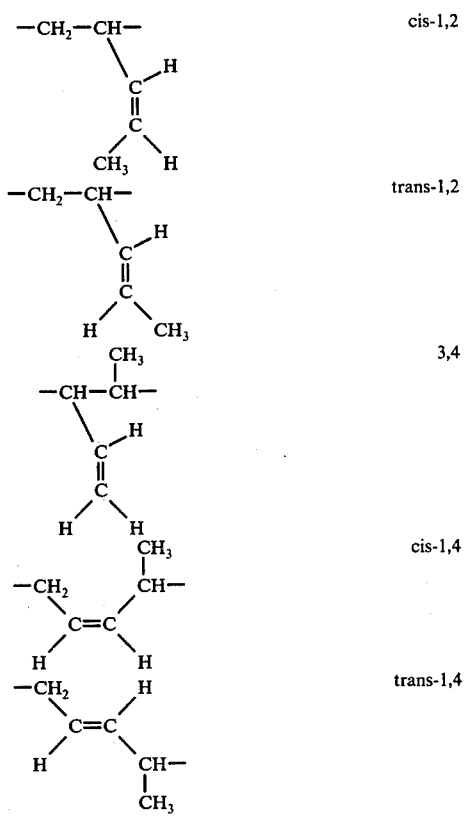

Such polypentadiene and its copolymer with 1,3-butadiene can be obtained by cationic polymerization of 1,3-pentadiene, a mixture of 1,3-pentadiene and 1,3-butadiene. It is a clear and light yellow liquid having a viscosity of 20 to 500,000 c.p.s. at 30° C.

The cationic polymerization is carried out with Friedel-Crafts type catalysts as described in the U.S. Pat. No. 3,884,712, the entire contents of which are incorporated herein by reference.

The lower aliphatic carboxylic acid used in the process of this invention has the formula RCOOH wherein R is hydrogen or alkyl having one to three carbon atoms. It is preferred to use formic acid, acetic acid and propionic acid, especially formic acid. The amount of the acid employed is from 0.05 to 4.0 moles, preferably 0.1 to 3.0 moles, per one unit mole of polypentadiene or its copolymer, wherein the term one unit mole equals A(68) + B(54) parts by weight, wherein A is the molar % of 1,3-pentadiene units (MW = 68) and B is the molar percent of 1,3-butadiene units (MW = 54), in the polymer. Thus 68 parts of polypentadiene is one unit mole.

The hydrogen peroxide is used in the form of an aqueous solution containing more than 30 wt.% up to about 90 wt.%, preferably, more than 50 wt.%, of hydrogen peroxide. The amount of hydrogen peroxide, on a 100% purity basis, is from 0.5 to 4.0 moles, preferably 0.7 to 3.0 moles, per one unit mole of polypentadiene or its copolymer.

Preferably, the reaction is carried out in the presence of an inert organic solvent, such as chloroform, carbon tetrachloride, benzene, toluene, or xylene, in the ratio of 1.0 to 4.0 moles of solvent, per one unit mole of polypentadiene or its copolymer, and in the presence of a catalyst, such as sulfuric acid, phosphoric acid, p-toluenesulfonic acid, in the ratio of 0.1 to 1 wt.% of catalyst, based on the weight of polypentadiene or its copolymer.

The reaction is carried out at a temperature of 30° to 100° C. The reaction is ordinarily complete in 1 to 10 hours.

By the above-mentioned method, epoxy groups, hydroxy groups and acyloxy groups are introduced at the double bonds in the polypentadiene or its copolymer, and thus there is obtained a modified polypentadiene or its copolymer having excellent film-forming properties.

In the present invention, it is preferred to use a polymer in which more than 80% of the double bonds of the cis-1,4 configuration, cis-1,2 configuration and 3,4 configuration in the starting polypentadiene or its copolymer, are reacted so as to have attached thereto epoxy groups, hydroxy groups and acyloxy groups.

The ratios of epoxy groups, hydroxy groups and acyloxy groups contained in the pentadiene polymer depend on the proportions of the polymer reactant, hydrogen peroxide and the lower aliphatic carboxylic acid.

The preferred ratio of epoxy: hydroxy: acyloxy groups in the modified polypentadiene or its copolymer for use as a paint and as an ink vehicle, is 5 to 9 : 1 to 5 : 1 to 5, by equivalents.

The preferred contents of (a) epoxy groups and (b) hydroxy and/or acyloxy groups, in the modified polypentadiene or its copolymer, based on the double bonds contained in the starting polymer, are respectively 10 to 43% for (a) and 2 to 30% for (b), more preferably, 12 to 25% for (a), and 4 to 20% for (b) and the sum of (a) and (b) are preferably 12 to 50%.

The heat-curable composition of this invention can be cured at 60° to 250° C, at a curing time of 5 to 60 minutes, preferably, at 120° to 180° C for 10 to 30 minutes.

The hardenable composition of this invention can contain only the modified polymer as the sole resinous material therein, but, preferably, it contains other resins such as alkyd resins, polyvinyl chloride, heat-curable acrylic resins, cellulosic resins, such as cellulose nitrate and cellulose acetate, and melamine-formaldehyde resins, together with the modified polymer.

Such resins are used in the ratio of 1.0 to 20 times as much, preferably 1.5 to 4 times as much, based on the weight to the modified polypentadiene or its copolymer. That is, the modified polypentadiene or its copolymer comprises from 5 to 100 wt.% of the total resinous component in the heat-curable composition, preferably about 5 to 50 wt.%, especially 20 to 40 wt.%, and the balance of the resinous component is one or more additional resins compatible therewith.

The hardenable composition, such as the printing ink and heat-curable paints, of this invention, can contain the conventional amounts of the conventional solvents used for paints or inks, such as benzene, toluene, xylene, cyclohexane, methyl acetate, ethyl acetate, butyl acetate, acetone, methyl ethyl ketone, methyl iso-propyl ketone, methyl cellosolve, ethyl cellosolve, butyl cellosolve, chloroform, methanol, diacetone alcohol, ethanol, propanol, iso-propanol, butanol, mineral spirit, kerosene, petroleum ether, ethylene glycol, propylene glycol and mixtures thereof.

Such solvents are used in amounts of 20 to 300 weight %, based on the total resinous components of the heat-curable composition.

In addition, conventional additives such as pigments, smoothening agents, etc. can be present in the heat-curable composition in the conventional amounts.

The heat-curable composition can be used in the form of aqueous emulsified coating compositions. In that case, surface active agents, such as nonionic surface active agents and anionic surface active agents (for example, polyoxyalkylene alkyl ethers, polyoxyalkylene alkyl phenyl ethers, polyoxyalkylene glycol stearates, polyoxyalkylene alkyl aryl ether sulfonates or sulfates, alkyl benzene sulfonates, higher fatty alcohol sulfonates, dialkyl sulfosuccinates, polyoxyalkylene sorbitan oleates or laurates, rosin soaps, fatty acid soaps, sorbitan-fatty acid esters, α-olefin sulfonates and so on), are used in an amount of 0.5 to 10 weight %, preferably 1 to 5 weight %, based on the weight of the resinous component containing the modified polymer, and water is used in an amount of 0.2 to 10 times, preferably 0.25 to 2 times, as much as the oily phase containing the solvent and the resinous material.

Furthermore, the heat curable composition can be used in the form of powder coating compositions. In that case, solvents are generally not used. The powder coating compositions of the present invention can contain other components, such as other resins, for example, acrylic resin and epoxy resin, fillers, pigments, hardeners and leveling agents.

The powder coating compositions of the present invention can be coated by the electrostatic powder coating method.

The following illustrative examples describe preferred embodiments of the invention in greater detail, but it is understood that the invention is not limited to the subject matter of these examples.

In the examples, the term "parts" means "parts by weight".

Preparations 1–8

Polypentadiene (obtained by cationic polymerization of 1,3-pentadiene, containing 70% of 1,2-bonded units), pentadiene-butadiene copolymer (obtained by cationic polymerization of 80 wt.% of 1,3-pentadiene and 20% wt.% of 1,3-butadiene, and containing 65% of 1,2- bonded units) and, as a control, polybutadiene (Poly Oil-110, made by Nippon Zeon K.K.), each having the molecular weights (M.W.) as listed in Table 1, were respectively dissolved in solvents, and then an aqueous solution of 80% formic acid and a catalyst were added under agitation.

Then an aqueous solution of 50% hydrogen peroxide

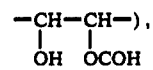

based on the starting polymer, are shown in the Table 1.

Table 1

| Preparation No. | | 1 | 2 | 3 | 4 | 5 | 6 | 7 | 8 |
|---|---|---|---|---|---|---|---|---|---|
| Starting polymer | | | | | | | | | |
| Polypentadiene | M.W. | 1,100 | 1,900 | 1,900 | 1,900 | 1,900 | 600 | | |
| | (parts) | 68.0 | 68.0 | 68.0 | 68.0 | 68.0 | 68.0 | | |
| Pentadiene- butadiene copolymer | M.W. (parts) | | | | | | | 1,100 68.0 | |
| Polybutadiene (control) | M.W. (parts) | | | | | | | | 1,100 52.0 |
| Solvent | | | | | | | | | |
| Chloroform | (parts) | 180 | 180 | | | | | 172 | 138 |
| Toluene | (parts) | | | 138 | 138 | 138 | 138 | | |
| Hydrogen peroxide | | | | | | | | | |
| 50% aqueous solution | (parts) | 102 | 102 | 61.2 | 34 | 54.5 | 68 | 98 | 78 |
| Lower aliphatic acid | | | | | | | | | |
| Formic acid | (parts) | 100 | 100 | 18.4 | 23 | 13.8 | 23 | 96 | 76 |
| Catalyst | | | | | | | | | |
| Sulfuric acid | (parts) | none | none | 0.17 | 0.68 | 0.097 | 0.272 | none | none |
| Reaction conditions | | | | | | | | | |
| Time | (hours) | 5 | 5 | 5 | 5 | 5 | 5 | 5 | 5 |
| Temperature | (° C) | 55 | 55 | 65 | 65 | 65 | 65 | 55 | 55 |
| Results of analysis | | | | | | | | | |
| Softening point | (° C) | 79–85 | 109–111 | 59–67 | 43–49 | 48–54 | 68–72 | 79–85 | 28–32 |
| Ratio of epoxidized double bond | (%) | 15.5 | 13.1 | 21.3 | 20.3 | 23.1 | 20.1 | 16.5 | 18.2 |
| Ratio of hydroxylated or formylated double bond | (%) | 14.2 | 17.4 | 9.6 | 7.8 | 7.3 | 9.7 | 17.3 | 24.3 | was slowly added thereto at 30° C.

The reaction was completed within the period of time and at the temperature as shown in Table 1.

The reaction mixture was then poured into water, and the oily phase was washed with water and then dried under vacuum.

The results of analyses of the thus-obtained lemon yellow products (softening point, the ratios of epoxidized double bonds and hydroxylated or formylated double bonds, which predominantly have the formula

EXAMPLES 1 - 11 AND COMPARATIVE EXAMPLES 1 - 3

The results of coating film tests, made employing the modified polymers according to the invention, coated on a soft steel plate and cured at 150° C for 20 min., are shown in Table 2, and they are compared to the results obtained using urethanized polypentadiene, modified polybutadiene and chlorinated rubber resins applied in like fashion.

Table 2

| Example No. | 1 | 2 | 3 | 4 | 5 | 6 | 7 | 8 | 9 | 10 | 11 | Comparative Example 1 | 2 | 3 |
|---|---|---|---|---|---|---|---|---|---|---|---|---|---|---|
| Preparation No. of modified polymer used | 1 | 2 | 7 | 3 | 4 | 2 | 3 | 2 | 4 | 2 | 3 | — | 8 | — |
| Component | | | | | | | | | | | | | | |
| Modified polypentadiene (parts) | 32 | 24 | | 24 | 24 | 24 | 32 | 32 | 32 | 24 | 24 | | | |
| Modified pentadiene-butadiene copolymer (parts) | | | 32 | | | | | | | | | | | |
| Modified polybutadiene (parts) | | | | | | | | | | | | | 32 | |
| Chlorinated rubber (parts) *1 | | | | | | | | | | | | | | 24 |
| Cizer-O-120 (parts) *2 | 8 | 6 | 8 | 6 | 6 | | | | | | | 8 | 6 | 6 |
| Cizer-O-180 (parts) *3 | | | | | | 6 | 8 | | | | | | | |
| Urethanized polypentadiene *4 | | | | | | | | | | | | 32 | | |
| Dioctyl phthalate | | | | | | | | 8 | 8 | 6 | 6 | | | |
| Toluene (parts) | 30 | 35 | 30 | 35 | 35 | 35 | 30 | 30 | 30 | 35 | 35 | 30 | 35 | 70 |
| Iso-propanol (parts) | 30 | 35 | 30 | 35 | 35 | 35 | 30 | 30 | 30 | 35 | 35 | 30 | 35 | |
| Test results | | | | | | | | | | | | | | |
| Film Thickness (μ) *5 | 30 | 25 | 33 | 32 | 31 | 32 | 30 | 32 | 31 | 33 | 31 | 32 | 31 | 33 |
| Sward Rocker hardness No. *6 | 29 | 32 | 29 | 28 | 26 | 27 | 27 | 33 | 35 | 32 | 33 | 35 | 20 | 27 |
| Adhesiveness *7-1 Cross cut (No/No) | 100/100 | 100/100 | 100/100 | 100/100 | 100/100 | 100/100 | 100/100 | 100/100 | 100/100 | 100/100 | 100/100 | 80/100 | 90/100 | 0/100 |
| Drawing test *7-2 (No/No) | 10/10 | 10/10 | 10/10 | 10/10 | 10/10 | 10/10 | 10/10 | 10/10 | 10/10 | 10/10 | 10/10 | 5/10 | 6/10 | 0/10 |
| Flexibility (Ericsen, mm) *8 | more than 9.8 | more than 9.8 | more than 9.8 | more than 9.8 | more than 9.8 | more than 9.8 | more than 9.8 | 9.2 | 9.6 | 9.3 | 9.1 | 3.5 | more than 9.8 | 5.4 |
| Flexibility | | | | | | | | | | | | | | |

Table 2-continued

| Example No. | 1 | 2 | 3 | 4 | 5 | 6 | 7 | 8 | 9 | 10 | 11 | Comparative Example 1 | 2 | 3 |
|---|---|---|---|---|---|---|---|---|---|---|---|---|---|---|
| (4 mm Mandrel) *9 | ○ | ○ | ○ | ○ | ○ | ○ | ○ | ○ | ○ | ○ | ○ | X | ○ | ○ |
| Impact strength (½ in. 500 g, 50 cm) *10 | ⊙ | ⊙ | ⊙ | ⊙ | ⊙ | ⊙ | ⊙ | ⊙ | ⊙ | ⊙ | ⊙ | X | ○ | X |
| Heat resistance (150° C, 3 hrs.) *11 | ⊙ | ⊙ | ⊙ | ⊙ | ⊙ | ⊙ | ⊙ | ⊙ | ⊙ | ⊙ | ⊙ | X | X | ○ |
| Light stability ΔE (10 hrs.) *12 | 1.32 | 0.94 | 1.26 | 1.13 | 1.25 | 0.98 | 1.16 | 1.86 | 1.93 | 1.76 | 1.82 | 18.6 | 12.1 | 14.9 |
| (40 hrs.) | 2.81 | 2.00 | 2.63 | 2.01 | 2.31 | 2.02 | 2.13 | 4.15 | 4.63 | 4.08 | 4.36 | 24.8 | 20.6 | 21.9 |

⊙ means superior, ○ means good, Δ means fair, X means bad.
*1 : chlorinated natural rubber, chlorine content 65% average molecular weight 25,000 – 30,000 (made by Asahi Denka Kogyo K.K.)
*2 : Epoxidized Soybean oil (made by Asahi Denka Kogyo K.K.)
*3 : Epoxidized Linseed oil (made by Oxyrane Chemical K.K.)
*4 : made from 1,6-hexane diisocyanate and modified polypentadiene of Production Example 2 of this invention
*5 : by JIS-K-5400-3.5
*6 : by Sward Rocker hardness tester
*7-1 : by Cross Cut Exfoliation tester (Made by Yasuda Seiki K.K.)
*7-2 : by Drawing Tester (made by Toyo Seiki K.K.)
*8 : by JIS-B-7777
*9 : by JIS-K-5400-6.15
*10 : by JIS-K-5400-6.13
*11 : by JIS-K-5400-7.4
*12 : by JIS-K-5400-6.16 (UV light 15W, 20 cm)

EXAMPLES 12 - 17 AND COMPARATIVE EXAMPLES 4 AND 5

The components shown in Table 3 are mixed and coated on a soft steel plate and cured, as described for Examples 1-11.

The results of the examination of the cured coating films are shown in Table 3.

Table 3

| Example No. | 12 | 13 | 14 | 15 | 16 | 17 | Comparative Example 4 | 5 |
|---|---|---|---|---|---|---|---|---|
| Preparation No. of modified polymer used | 3 | 4 | 5 | 6 | 7 | 2 | 8 | — |
| Components | | | | | | | | |
| Modified polypentadiene (parts) | 10 | 20 | 10 | 10 | | 10 | | |
| Modified pentadiene-butadiene copolymer (parts) | | | | | 10 | | | |
| Modified polybutadiene (parts) | | | | | | | 10 | |
| Alkyd resin 1 (parts) *13 | 70 | 70 | 70 | 70 | 70 | | 70 | 70 |
| Alkyd resin 2 (parts) *14 | | | | | | 70 | | |
| Melamine resin 1 (parts) *15 | 20 | 10 | 20 | 20 | 20 | 20 | 20 | 30 |
| Titanium white (parts) | 43 | 43 | 43 | 43 | 43 | 43 | 43 | 43 |
| Solvent *16 | | | | Suitable for brushing | | | | |
| Results of cured coating films cured at 150° C for 20 min. | | | | | | | | |
| Film thickness (μ) *5 | 43 | 37 | 38 | 41 | 42 | 40 | 42 | 41 |
| Specular gloss (%) *17 | 95.0 | 94.0 | 93.2 | 94.4 | 94.3 | 93.8 | 91.0 | 90.1 |
| Sward Rocker hardness No. *6 | 19 | 16 | 17 | 20 | 19 | 18 | 16 | 22 |
| Adhesiveness *7-1 Cross cut (No/No) | 100/100 | 100/100 | 100/100 | 100/100 | 100/100 | 100/100 | 95/100 | 90/100 |
| Drawing test (No/No) *7-2 | 10/10 | 10/10 | 10/10 | 10/10 | 10/10 | 10/10 | 8/10 | 6/10 |
| Flexibility (Ericsen, mm) *8 | 7.4 | 7.5 | 8.0 | 8.0 | 7.8 | 7.9 | 7.8 | 6.8 |
| Flexibility (2 mm Mandrel) *9 | ⊙ | ⊙ | ⊙ | ⊙ | ⊙ | ⊙ | ⊙ | ⊙ |
| Impact strength (½ in. 500 g, 50 cm) *10 | ⊙ | ⊙ | ⊙ | ⊙ | ⊙ | ⊙ | ⊙ | Δ |
| Alkali resistance (5% NaOH, 7 days) *18 | ○ | ○ | ○ | ○ | ○ | ○ | ○ | Δ |
| Acid resistance (5% H₂SO₄, 7 days *19 | ○ | ○ | ○ | ○ | ○ | ○ | ○ | Δ |
| Solvent resistance *20 | | | | | | | | |
| Mineral spirit, 24 hrs. | ⊙ | ⊙ | ⊙ | ⊙ | ⊙ | ⊙ | ○ | Δ |
| Petroleum benzine, 24 hrs. | ⊙ | ⊙ | ⊙ | ⊙ | ⊙ | ⊙ | ○ | Δ |
| Light stability (100 hrs., Δ E, Lab) *12 | 1.98 | 2.14 | 2.69 | 2.65 | 2.02 | 2.31 | 4.38 | 5.98 |
| Weatherability (200 hrs.) *21 | ⊙ | ⊙ | ○ | ○ | ○ | ⊙ | X | ○ |
| Salt spray test (5% NaCl, 100 hrs.) *22 | ○ | ⊙ | ⊙ | ○ | ○ | ⊙ | ○ | Δ |

*13 : Phtal Kid 130-60 (made by Hitachi Kasei K.K.) modified by soybean oil.
*14 : Phtal Kid 133-60 (made by Hitachi Kasei K.K.) modified by coconut oil.
*15 : Melan #20 (made by Hitachi Kasei K.K.)
*16 : xylene/n-butanol/diacetone alcohol = 3/1/1, or toluene/isopropanol/diacetone alcohol = 3/1/1
*17 : 60° reflection test by JIS-K-5400-6.6
*18 : by JIS-K-5400-7.4
*19 : by JIS-K-5400-7.5
*20 : by JIS-K-5400-7.7
*21 : by JIS-K-5400-8.9
*22 : by JIS-K-5400-7.8

EXAMPLES 18 – 23 AND COMPARATIVE EXAMPLES 6 AND 7

The components shown in Table 4 were mixed and coated on a soft steel plate and cured, as described for Examples 1–11.

The results of the examination of the cured coating films are shown in Table 4.

Table 4

| Example No. | 18 | 19 | 20 | 21 | 22 | 23 | Comparative Example 6 | 7 |
|---|---|---|---|---|---|---|---|---|
| Preparation No. of modified polymers used | 3 | 4 | 5 | 6 | 7 | 4 | 8 | — |
| Components |  |  |  |  |  |  |  |  |
| Modified polypentadiene (parts) | 10 | 10 | 20 | 10 |  | 20 |  |  |
| Modified pentadiene-butadiene copolymer (parts) |  |  |  |  | 10 |  |  |  |
| Modified polybutadiene (parts) |  |  |  |  |  |  | 10 |  |
| Acrylic resin 1 (parts) *23 | 70 | 70 | 70 | 70 | 70 |  | 70 | 70 |
| Acrylic resin 2 (parts) *24 |  |  |  |  |  | 70 |  |  |
| Melamine resin 1 (parts) *15 | 20 | 20 | 10 | 20 | 20 | 10 | 20 | 30 |
| Titanium white (parts) | 43 | 43 | 43 | 43 | 43 | 43 | 43 | 43 |
| Solvent *16 | Suitable for brushing | | | | | | | |
| Results of cured coating films cured at 150° C for 20 min. |  |  |  |  |  |  |  |  |
| Film thickness (μ) *5 | 27 | 31 | 28 | 29 | 30 | 29 | 31 | 29 |
| Specular gloss (%) *17 | 92.7 | 93.1 | 94.3 | 91.6 | 91.8 | 94.8 | 92.4 | 89.8 |
| Sward Rocker hardness No. (1 kg) *6 | 35 | 38 | 38 | 36 | 36 | 40 | 31 | 42 |
| Adhesiveness Drawing test (No/No) *7-2 | 10/10 | 10/10 | 10/10 | 10/10 | 10/10 | 10/10 | 10/10 | 10/10 |
| Impact strength (¼ in. 500 g, 50 cm) *10 | ○ | ○ | ○ | ○ | ○ | ○ | ○ | Δ |
| Alkali resistance (5% NaOH, 7 days) *18 | ⊙ | ⊙ | ⊙ | ⊙ | ⊙ | ⊙ | ○ | ⊙ |
| Acid resistance (5% H₂SO₄, 7 days) *19 | ⊙ | ⊙ | ⊙ | ⊙ | ⊙ | ⊙ | ○ | ⊙ |
| Salt spray test (5% NaCl, 100 hrs.) *22 | ○ | ⊙ | ⊙ | ○ | ○ | ⊙ | Δ | Δ |
| Hot water resistance (1 hour) *25 | ○ | ⊙ | ⊙ | ⊙ | ○ | ○ | Δ | Δ |
| Light stability (100 hrs. Δ E, Lab) *11 | 1.41 | 2.41 | 1.86 | 2.57 | 1.62 | 2.15 | 4.62 | 5.64 |
| Weatherability (100 hrs.) *21 | ⊙ | ○ | ⊙ | ○ | ○ | ⊙ | X | Δ |

*23 : Hitaroide 2431 (made by Hitachi Kasei K.K.)
*24 : Hitaroide 2432 (made by Hitachi Kasei K.K.)
*25 : by JIS-K-5400-7.3

EXAMPLES 24 – 26 AND COMPARATIVE EXAMPLE 8

The components shown in Table 5 were mixed and coated on a soft steel plate and cured, as described in Examples 1–11.

The results of the examination of the cured coating films are shown in Table 5.

Table 5

| Example No. | 24 | 25 | 26 | Comparative Ex. 8 |
|---|---|---|---|---|
| Preparation No. of modified polymer used | 2 | 3 | 2 | — |
| Components |  |  |  |  |
| Modified polypentadiene (parts) | 10 | 10 | 15 |  |
| Modified pentadiene-butadiene copolymer (parts) |  |  |  |  |
| Modified polybutadiene (parts) |  |  |  |  |
| Melamine resin 1 (parts) *15 | 10 | 10 | 5 | 20 |
| Acrylic resin 1 (parts) *23 | 70 | 70 |  | 70 |
| Acrylic resin 2 (parts) *24 |  |  | 70 |  |
| Epoxy resin 1 (parts) *26 | 10 | 10 | 10 | 10 |
| Titanium white (parts) | 66.7 | 66.7 | 66.7 | 66.7 |
| Solvent *16 | Control to 25 sec. by Rossman Visco Blade Spray in vis. | | | |
| Results of cured coating films cured at 150° C for 20 min. |  |  |  |  |
| Film thickness (μ) *5 | 25 | 26 | 24 | 25 |
| Specular gloss (%) *17 | 83.5 | 85.2 | 86.3 | 74.8 |
| Sward Rocker hardness No. *6 | 25 | 24 | 25 | 25 |
| Adhesiveness Drawing test (No/No) *7-2 | 10/10 | 10/10 | 10/10 | 10/10 |
| Flexibility (Ericsen, mm) *8 | 9.0 | 9.2 | 8.6 | 7.8 |
| Flexibility (3 mm Mandrel) *9 | ○ | ○ | ○ | Δ |
| Impact strength (¼ in. 500 g, 50 cm) *10 | ⊙ | ⊙ | ⊙ | ○ |
| Spraying Properties by air spray | ⊙ | ⊙ | ⊙ | X |
| Quality of cured coating film | ⊙ | ⊙ | ⊙ | X |
| Solvent resistance xylene, 24 hrs. *20 | ⊙ | ⊙ | ⊙ | ○ |
| Salt spray test (5% NaCl, 100 hrs.) *22 | ⊙ | ⊙ | ⊙ | X |
| Light stability (100 hrs., Δ E, Lab) *12 | 1.7 | 1.6 | 1.3 | 4.2 |
| Weatherability (specular gloss after 200 hrs.) *21 | 76.2 | 77.5 | 78.2 | 68.5 |
| Hot water resistance (1 hr.) *25 | ⊙ | ⊙ | ⊙ | ○ |

*26: EP5100-75X (made by Asahi Denka Kogyo K.K.) xylene solution of solid diglycidyl ether of bisphenol A having 450–500 of Epoxy equivalent.

EXAMPLES 27 – 33 AND COMPARATIVE EXAMPLE 9

The components shown in Table 6 were mixed and coated on a soft steel plate and cured, as described in Examples 1–11.

The results of the examination of the cured coating films are shown in Table 6.

Table 6

| Example No. | 27 | 28 | 29 | 30 | 31 | 32 | 33 | Comparative Example 9 |
|---|---|---|---|---|---|---|---|---|
| Preparation No. of Modified polymer used | 2 | 2 | 2 | 3 | 4 | 2 | 4 | — |
| Components | | | | | | | | |
| Modified polypentadiene (parts) | 30 | 30 | 30 | 20 | | 30 | | |
| Modified pentadiene-butadiene copolymer (parts) | | | | | 30 | | 30 | |
| Polyvinyl chloride 1 (parts) *27 | 70 | 40 | 70 | 80 | | 70 | | 70 |
| Polyvinyl chloride 2 (parts) *28 | | 30 | | | 70 | | 70 | |
| Dioctyl phthalate (parts) | 30 | 30 | 30 | 30 | 30 | 30 | 30 | 30 |
| Titanium white (parts) | 50 | 50 | 50 | 50 | 50 | 50 | 50 | 35 |
| Solvent (parts) *29 | 50 | 50 | 50 | 50 | 50 | 50 | 50 | 35 |
| Results of cured coating films cured at 150° C for 20 min. | | | | | | | | |
| Film thickness (μ) *5 | 40 | 37 | 42 | 41 | 41 | 41 | 39 | 23 |
| Specular gloss (%) *17 | 77 | 76 | 66 | 79 | 72 | 72 | 75 | 28.3 |
| Sward Rocker hardness No. *6 | 11 | 12 | 11 | 13 | 12 | 13 | 12 | 15 |
| Adhesiveness | | | | | | | | |
| Cross cut (No/No) *7-1 | 100/100 | 100/100 | 100/100 | 100/100 | 100/100 | 100/100 | 100/100 | 80/100 |
| Drawing test (No/No) *7-2 | 10/10 | 10/10 | 10/10 | 10/10 | 10/10 | 10/10 | 10/10 | 6/10 |
| Flexibility (Ericsen, mm) *8 | more than 9.8 | more than 9.8 | more than 9.8 | more than 9.8 | more than 9.8 | more than 9.8 | more than 9.8 | 6.4 |
| Flexiblity (2 mm Mandrel) *9 | ◉ | ◉ | ◉ | ◉ | ◉ | ◉ | ◉ | ○ |
| Impact strength (½ in. 500 g, 50 cm) *10 | ◉ | ◉ | ◉ | ◉ | ◉ | ◉ | ◉ | ○ |
| Light stability (100 hrs., Δ E, Lab) *12 | 10.2 | 8.3 | 9.4 | 9.8 | 8.6 | 9.3 | 8.9 | 18.2 |

*27 : Vinylite VYHH (containing 13 – 15% of vinyl acetate, made by Union Carbide Corp.)
*28 : Vinylite VAGH (containing 6% of vinyl alcohol and 13% of vinyl acetate, made by Union Carbide Corp.)
*29 : Methyl iso-butyl ketone/toluene = 1/1

EXAMPLES 34 – 36 AND COMPARATIVE EXAMPLES 10 – 11

Printing ink vehicles were made from the components shown in Table 7, and the properties of the ink vehicle and the properties of gravure printing made therefrom were examined.

The results are shown in Table 7.

EXAMPLES 37 – 39 AND COMPARATIVE EXAMPLES 12 – 14

The components shown in Table 8 were pulverized and mixed, and precured with a roll mill at 90° C, for 5 min. Then the mixture was re-pulverized and sieved through a screen of 250 mesh size, and coated on a steel plate by a powder coating machine (Gem-720, Coating Spray Gun).

The results of the examination of the coating are shown in Table 8.

Table 7

| Example No. | 34 | 35 | 36 | Comparative Example 10 | Comparative Example 11 |
|---|---|---|---|---|---|
| Preparation of modified polymer used | 2 | 3 | 1 | — | — |
| Components | | | | | |
| Modified polypentadiene (parts) *1 | 30 | 30 | 30 | | |
| Chlorinated rubber (parts) *1 | | | | 30 | |
| Polyamide (parts) *30 | | | | | 30 |
| Cellulose nitrate (parts) *31 | 10 | 10 | 10 | 10 | 10 |
| Pigments (parts) *32 | 10 | 10 | 10 | 10 | 10 |
| Solvent (parts) *33 | 60 | 60 | 60 | 60 | 60 |
| Results | | | | | |
| Viscosity of the vehicle (Rossman Visco Blade Brush in vis., sec.) | 22 | 20 | 22 | 23 | 23 |
| after 30 days at 25° C | 25 | 24 | 27 | 29 | 32 |
| Specular gloss of printed surface | 39.5 | 38.5 | 37.2 | 35.2 | 31.6 |
| Fineness and Brightability of color | ◉ | ◉ | ◉ | ○ | ○ |
| Heat resistance (art paper, ° C) | 106 | 106 | 109 | 102 | 100 |
| Adhesiveness (tape test) | | | | | |
| Art paper | ◉ | ◉ | ◉ | ○ | ○ |
| Cellophane | ◉ | ◉ | ◉ | ○ | ○ |
| Moistureproof cellophane | ◉ | ◉ | ◉ | ○ | ○ |
| Polypropylene | ◉ | ◉ | ◉ | ○ | X |
| Flexibility (rubbing test of cellophane by hands) | ◉ | ◉ | ◉ | ○ | ○ |

*30 : Polyamide - S - 40E (made by Sanyo Kasei K.K.)
*31 : Cellulose nitrate ½'ss (made by Daicel K.K.)
*32 : Lionel DNG (red pigment)
*33 Toluene/Ethyl acetate/Iso-propanol = 5/2/3

Table 8

| Example No. | | 37 | 38 | 39 | Comparative Example 12 | Comparative Example 13 | Comparative Example 14 |
|---|---|---|---|---|---|---|---|
| Preparation No. of modified polmyer used | | 2 | 2 | 6 | | | |
| Components: | | | | | | | |
| Modified polypentadiene | (parts) | 10 | 25 | 10 | | | |
| Acrylic resin | (parts) *34 | 100 | 100 | 100 | 100 | 100 | 100 |
| Epoxy resin | (parts) *35 | | | | 25 | 10 | |
| Titanium white | (parts) | 30 | 30 | 30 | 30 | 30 | 30 |
| Hardener | (parts) *36 | 10 | 10 | 10 | 10 | 10 | 10 |
| Curing | | | | | | | |
| Time (min.) | | 20 | 30 | 20 | 20 | 20 | 20 |
| Temperature (° C) | | 200 | 160 | 200 | 200 | 200 | 200 |
| Results: | | | | | | | |
| Compatibility with acrylic resin before curing | | ⊙ | ⊙ | ⊙ | X | ○ | ○ |
| Film thickness (μ) | *5 | 73 | 72 | 84 | 75 | 74 | 77 |
| Sward Rocker hardness No. | *6 | 40 | 34 | 40 | 30 | 39 | 34 |
| Specular Gloss (%) | *17 | 89.2 | 88.7 | 85.4 | 67.5 | 81.5 | 81.0 |
| Pencil test of hardness | | 2H | 2H | 2H | H | H | H |
| Adhesiveness: | | 100 | 100 | 100 | 100 | 100 | 90 |
| Cross cut (No/No) | | 100 | 100 | 100 | 100 | 100 | 100 |
| Drawing test (No/No) | *7 | 10/10 | 10/10 | 10/10 | 10/10 | 9/10 | 6/10 |
| Results: | | | | | | | |
| Flexibility (Ericsen, mm) | *8 | 5.4 | 5.3 | 5.7 | 3.8 | 4.5 | 4.0 |
| Impact strength (¼ in., 500 g, cm) | *10 | 35 | 35 | 40 | 30 | 30 | 30 |
| Light stability (Δ E, 100 hrs.) | *12 | 1.65 | 2.00 | 1.80 | 4.51 | 3.70 | 3.50 |

*34: ALMATEX-PD-2200 (containing epoxy group having 1300 of epoxy eq. made by Mitsui Toatsu K.K.)
*35: Epikote 1004 (made by Shell Ltd.)
*36: Dodecandioic acid

EXAMPLES 40 – 48 AND COMPARATIVE EXAMPLE 15

The components shown in Table 9 were emulsified and coated on a soft steel plate. Then the assembly was cured at 150° C for 30 minutes.

The results of examination of the coatings are shown in Table 9.

Table 9

| Example No. | | 40 | 41 | 42 | 43 | 44 | 45 | 46 | 47 | 48 | Comparative Example 15 |
|---|---|---|---|---|---|---|---|---|---|---|---|
| Preparation No. of modified polymer used | | 2 | 3 | 2 | 4 | 3 | 2 | 4 | 2 | 3 | |
| Components | | | | | | | | | | | |
| Modified polypentadiene | (parts) | 32 | 24 | 10 | 20 | 20 | 20 | 20 | 20 | 30 | |
| Chlorinated rubber | (parts) *1 | | | | | | | | | | 80 |
| Cizer-O-120 | (parts) *2 | 8 | | | | | | | | | 20 |
| Cizer-O 180 | (parts) *3 | | 6 | | | | | | | | |
| Alkyd resin | (parts) *13 | | | 70 | | | | | | | |
| Acrylic resin 1 | (parts) *23 | | | | 70 | | 80 | | | | |
| Acrylic resin 2 | (parts) *24 | | | | | 70 | | 80 | | | |
| Melamine resin 1 | (parts) *15 | | | 20 | 10 | 10 | | | | | |
| Polyvinyl chloride 1 | (parts) *27 | | | | | | | | 50 | 40 | |
| Toluene | (parts) | 50 | 40 | 90 | 90 | 90 | 90 | 50 | 50 | 50 | 100 |
| iso-propanol | (parts) | | | 10 | 10 | 10 | 10 | | | | |
| Methyl iso-Butyl ketone | (parts) | | | | | | | 50 | 50 | 50 | |
| Surface active agent 1 | (parts) *37 | 1 | 1 | | | | | 2 | | 2 | 2 |
| Dioctyl Phthalate | (parts) | | | | | | | | 30 | 30 | |
| Surface active agent 2 | (parts) *38 | | | 2 | | 2 | | | | | |
| Surface active agent 3 | (parts) *39 | | | | 2 | | | 2 | 2 | | |
| Water | (parts) | 20 | 20 | 120 | 130 | 150 | 100 | 100 | 130 | 80 | 80 |
| Results | | | | | | | | | | | |
| Stability of emulsion after 1 day | | ⊙ | ⊙ | ⊙ | ⊙ | ⊙ | ⊙ | ⊙ | ⊙ | ⊙ | ⊙ |
| Stability of emulsion after 10 days | | ⊙ | ⊙ | ⊙ | ⊙ | ⊙ | ⊙ | ⊙ | ⊙ | ⊙ | ○ |
| Film thickness (μ) | *5 | 32 | 31 | 33 | 34 | 32 | 32 | 31 | 33 | 33 | 33 |
| Sward Rocker Hardness | *6 | 29 | 30 | 17 | 19 | 20 | 19 | 22 | 13 | 13 | 27 |
| Specular Gloss (%) | *17 | 82.1 | 81.2 | 90.3 | 81.5 | 86.2 | 87.3 | 79.2 | 63.4 | 61.3 | 61.1 |
| Adhesiveness | *7-1 | 100 | 100 | 100 | 100 | 100 | 100 | 100 | 100 | 100 | 0 |
| Cross cut (No/No) | | 100 | 100 | 100 | 100 | 100 | 100 | 100 | 100 | 100 | 100 |
| Drawing test (No/No) | *7-2 | 10/10 | 10/10 | 10/10 | 10/10 | 10/10 | 10/10 | 10/10 | 10/10 | 10/10 | 0/100 |
| Flexibility (Ericsen, mm) | *8 | 9.8 | 9.8 | 7.8 | 7.9 | 7.5 | 8.0 | 9.0 | 9.8 | 9.8 | 5.4 |
| Flexibility (2mm Mandrel) | *9 | ⊙ | ⊙ | ⊙ | ⊙ | ⊙ | ⊙ | ⊙ | ⊙ | ⊙ | ○ |
| Impact strength (¼ in., 500 g, 50 cm) | *10 | ⊙ | ⊙ | ⊙ | ○ | ⊙ | ○ | ⊙ | ○ | ○ | X |
| Light stability (ΔE, 100 hrs.) | *12 | 1.35 | 0.97 | 1.97 | 2.18 | 1.42 | 1.87 | 1.72 | 9.8 | 9.8 | 14.9 |
| Alkali resistance (5% NaOH, 7 days) | *18 | ⊙ | ⊙ | ⊙ | ⊙ | ⊙ | ⊙ | ⊙ | ⊙ | ⊙ | X |
| Acid resistance (5% H₂SO₄, 7 days) | *19 | ⊙ | ⊙ | ⊙ | ⊙ | ⊙ | ⊙ | ⊙ | ⊙ | ⊙ | X |

Table 9-continued

| Example No. | | 40 | 41 | 42 | 43 | 44 | 45 | 46 | 47 | 48 | Comparative Example 15 |
|---|---|---|---|---|---|---|---|---|---|---|---|
| Salt spray test (5% NaCl, 100 hrs.) | *22 | ⊚ | ⊚ | ⊚ | ⊚ | ⊚ | ⊚ | ⊚ | ⊚ | ⊚ | X |

*37:Adekanol PC-10/NPE-10/Pre Tex-DT(60%) = 70/25/5 Adekanol PC-10: para-cumyl phenol ethoxylate made by Asahi Denka Kogyo K.K. NPE-10; nonyl phenol ethoxylate made by Kao Atlas K.K. Pre Tex DT: sodium dioctyl sulfosuccinate made by Kao Atlas K.K.
*38 : Adekanol PC-10 / NPE-10 / Pre Tex - DT (60%) = 25/70/5
*39 : Adekanol PC-10 / NPE-10 / Disprosion K-25 (25%) - 18/57/25 Disprosion K-25: Rosin soap made by Toho Kagaku K.K.

The embodiments of the invention in which an exclusive property or privilege is claimed are defined as follows:

1. A hardenable composition comprising as a film-forming component a final polymer prepared by reacting (A) a starting polymer prepared by cationic polymerization and consisting of 60 to 100 mole percent of 1,3-pentadiene units and zero to 40 mole percent of 1,3-butadiene units wherein from 50 to 90 molar percent of said units are in cis-1,2 and trans-1,2 configuration and the balance of said units are in 3,4, cis-1,4 and trans-1,4 configuration, said starting polymer having an average molecular weight of about 300 to 10000, with (B) an aqueous solution containing more than 30 up to about 90 weight percent of hydrogen peroxide wherein the amount of hydrogen peroxide is from 0.7 to 3.0 moles per unit mole of said starting polymer, and with (C) a carboxylic acid having the formula RCOOH, wherein R is hydrogen or alkyl having one to three carbon atoms, wherein the amount of said carboxylic acid is from 0.1 to 3.0 moles per unit mole of said starting polymer, the reaction being carried out at 30° to 100° C to obtain said final polymer having a molecular weight of 320 to 15000 and containing 12 to 25 percent of epoxy groups, from 4 to 20 percent of hydroxy groups and acyloxy groups, based on the double bonds contained in the starting polymer, and wherein the ratio of epoxy groups : hydroxy groups : acyloxy groups is 5 to 9 : 1 to 5 : 1 to 5 by equivalents.

2. A hardenable composition according to claim 1 in which said starting polymer consists of poly-1,3-pentadiene.

3. A hardenable composition according to claim 2 in which said acid is formic acid.

4. A hardenable composition according to claim 1 in which the molecular weight of the starting polymer is from 500 to 5000, and the molecular weight of the final polymer is from 550 to 7500.

* * * * *